United States Patent [19]
Kobayashi et al.

[11] 3,955,984
[45] May 11, 1976

[54] SILVER HALIDE PHOTOGRAPHIC LIGHT-SENSITIVE MEMBER WITH BACKING LAYER

[75] Inventors: Teruo Kobayashi; Tohru Sueyoshi; Masatoshi Sugiyama; Hiroshi Sawaguchi, all of Minami-ashigara, Japan

[73] Assignee: Fuji Photo Film Co., Ltd., Minami-ashigara, Japan

[22] Filed: Apr. 18, 1975

[21] Appl. No.: 569,434

[30] Foreign Application Priority Data

Apr. 19, 1974 Japan .............................. 49-43296

[52] U.S. Cl. .................................. 96/84 R; 96/85; 96/114; 96/86 R; 96/87 R; 260/240 D; 260/240.9

[51] Int. Cl.$^2$ ...................... G03C 1/84; G03C 1/78; C09B 23/14

[58] Field of Search .......... 96/84 R, 85, 86 R, 87 R, 96/114; 260/240 D, 240.9

[56] References Cited

UNITED STATES PATENTS

| | | | |
|---|---|---|---|
| 2,405,106 | 7/1946 | Widmer et al. | 96/84 R |
| 3,113,825 | 10/1963 | Streck | 260/240 D |
| 3,384,487 | 5/1968 | Heseltine et al. | 96/84 R |
| 3,481,927 | 12/1969 | Heseltine et al. | 96/84 R |
| 3,652,283 | 3/1972 | Mackey | 96/84 R |
| 3,782,933 | 1/1974 | Ohlschlager et al. | 260/240 D |

*Primary Examiner*—Jack P. Brammer
*Attorney, Agent, or Firm*—Sughrue, Rothwell, Mion, Zinn & Macpeak

[57] ABSTRACT

A silver halide photographic light-sensitive member comprising a support having on one side of the support at least one silver halide photographic emulsion layer and on the other side of the support at least one layer containing at least one dye represented by the general formula (I):

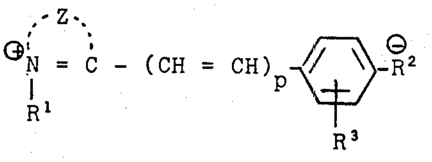

(I)

wherein Z is a group of atoms required for forming an indolenine nucleus or benzindolenine nucleus; $R^1$ is a lower alkyl group or a lower alkenyl group; $R^2$ is an $—OXSO_3^-$ group or an

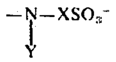

group wherein X is an alkylene group or an alkenylene group, and Y is a hydrogen atom, an alkyl group, an alkenyl group, an aryl group, an acyl group, or an $—OXSO_3^-$ group; $R^3$ is a hydrogen atom, a halogen atom, an alkyl group, an alkenyl group, a hydroxy group, an alkoxy group, an alkylthio group, a carboxy group, an alkoxycarbonyl group, an alkoxycarbonylamino group, or an acylamino group; and *p* is an integer of 1 or 2.

10 Claims, No Drawings

SILVER HALIDE PHOTOGRAPHIC LIGHT-SENSITIVE MEMBER WITH BACKING LAYER

BACKGROUND OF THE INVENTION

1. Field of the Invention

The present invention relates to a silver halide photographic light-sensitive member with at least one backing layer containing dyes.

2. Description of the Prior Art

Where a silver halide photographic light-sensitive member has a photographic emulsion layer on one side of a support thereof, a layer called a backing layer on the other side of the support is sometimes employed. This backing layer is provided for the purpose of preventing halation, being able to distinguish the face of the light-sensitive member in a safety light, preventing light fog, preventing curling, preventing charging, and the like. Where the prevention of halation, ability to distinguish the face, or prevention of light fog is intended, the backing layer is colored (including black-coloration) using dyes or pigments so that it absorbs light sufficiently in the wavelength region to be absorbed.

The thus-colored backing layer must be removed or decolored in the course of photographic processing in a manner which does not effect adversely the photographic image formed at the photographic processing. Except for the case where the backing layer must remain after the end of the photographic processing for the purpose of preventing curling, and the like, it is rather desirable for the backing layer to be removed in the course of photographic processsing after exposure, for instance, in the course of developing by the use of an alkaline developer. This is because the surface of the backing layer is damaged and the backing layer tends to interfere with the photographic image. Where the backing layer is removed from the light-sensitive member during photographic processing, it is desirable for the dye or pigment used in coloring the backing layer to be decolored in a photographic processing solution and not contaminate the photographic processing solution. For example, where the backing layer is soluble in the alkaline developer, the dye or pigment preferably is decolored in the developer.

Hitherto, in coloring the backing layer, pigments such as carbon black, manganese dioxide, and the like, or dyes such as a triphenylmethane and the like have been used. The use of compounds, which are soluble in low boiling organic solvents such as alcohols and the like, in the backing layer is advantageous from the standpoint of commercial production in that coating solutions using such organic solvents as a solvent can be used and the drying of coated layers is easy. Thus these methods have been used for a long time. Alcohols such as methanol and ethanol, ketones such as acetone and methyl ethyl ketone, esters such as methyl acetate and the like, etc., can be used as the solvent. Of these solvents, alcohols such as methanol, ethanol, and the like are most generally used because they are easily handled. In this case, dyes which are soluble in the alcohols are used.

Known alcohol-soluble dyes for the backing layer include oxonol dyes containing a pyrazolone nucleus, styryl dyes containing an indole nucleus, and the like as well as triphenylmethane dyes or diphenylmethane dyes. A number of triphenylmethane dyes for this purpose are known, and examples include those dyes as described in, for example, Japanese Pat. Nos. 3,141/1938, 3,083/1953; British Pat. Nos. 294,104, 373,004, 446,583, 790,023, 1,025,567; West German Pat. Nos. 1,038,395, 1,447,792; Belgian Pat. Nos. 632,536, 661,585; U.S. Pat. Nos. 1,912,792, 2,147,112, 2,150,695, 3,018,177, 3,382,074, etc. Known oxonol dyes for this purpose are those dyes as described in, for example, Example 1 of British Pat. No. 506,385 and Japanese Pat. No. 18,439/1966. Known styryl dyes for this purpose are those dyes as described in, for example, Japanese Pat. No. 5,920/1956; and U.S. Pat. Nos. 1,845,404 and 3,652,283.

Of these dyes, triphenylmethane dyes are comparatively preferred as the dye for the backing layer because they have a relatively high absorption density, they are readily decolored in an alkaline developer containing a sulfite, and the like. However, where these dyes are contacted with the photographic emulsion layer for a long period of time, that is, the backing layer containing these dyes or fragments thereof is contacted with the photographic emulsion layer for a long period of time, a slight desensitization often results. Since Fuchsine and imine structures contained in triphenylmethane dyes are harmful to the human body, for example, carcinogenic, mass production of these dyes or their starting materials are not desired.

Oxonol dyes have little tendency to cause desensitization and fog even when contacted with the photographic emulsion layer and are harmless to living things. However, since their absorption densities are low, they are disadvantageous in preventing halation and light fog. Furthermore, where the light-sensitive member is subjected to supersonic cleaning in a cleaning solution comprising chlorinated lower hydrocarbons prior to exposure, alcohol-soluble oxonol dyes are inadequate in that they dissolve in the cleaning solution and cause the cleaning solution to become colored. In a light-sensitive member for recording and reproducing a minute image, for instance, a light-sensitive member for producing a photomask as used in the course of producing an integrated circuit element, the presence of dust provides a significant defect in the image, and thus it is necessary to remove dust using the above supersonic cleaning. In this supersonic cleaning, the most generally used cleaning solution is 1,1,1-trichloroethane. If dyes dissolve in the cleaning solution during supersonic cleaning, the cleaning solution is gradually colored and ultimately the emulsion layer of the light-sensitive member is colored.

The hitherto known styryl dyes have good absorbance, good photographic chemical effect on a photographic emulsion and freedom from biological hazards. However, most are soluble in chlorinated hydrocarbons and are insufficiently decolored in an alkaline developer containing a sulfite. Thus, these dyes color the developer, particularly after the developer has been used in processing a large number of light-sensitive members. Dyes having a sulfoalkyl group as a substituent on a nitrogen atom of an indolenine nucleus as described in U.S. Pat. No. 3,384,487 are insoluble in chlorinated lower hydrocarbons, but insufficiently soluble in alcohols, and thus it is difficult to produce a backing layer having a sufficient absorption density using these dyes.

SUMMARY OF THE INVENTION

An object of the present invention is to provide a silver halide photographic member having a backing layer which possesses sufficient absorbance and which does not adversely affect the photographic capability of a photographic emulsion layer even though contacted with the photographic emulsion layer.

Another object of the present invention is to provide a silver halide photographic member having a backing layer which is colored with a dye which does not color a cleaning solution comprising chlorinated lower hydrocarbons even if the member is washed with the cleaning solution.

A further object of the present invention is to provide a silver halide photographic member having a backing layer which is colored with a dye which does not contaminate a developer through coloration.

Another object of the present invention is to provide a silver halide photographic member having a backing layer which is colored with a dye which is harmless to living things.

It has been found that these objects are attained with a silver halide photographic light-sensitive member comprising a support having on one side of the support at least one light-sensitive silver halide emulsion layer and on the opposite side of the support a backing layer containing at least one styryl dye containing an indolenine nucleus or benzindolenine nucleus of the formula (I):

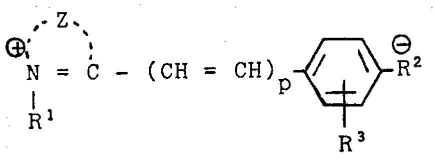
(I)

wherein Z is a group of atoms required for forming an indolenine nucleus or a benzindolenine nucleus; $R^1$ is a lower alkyl group or a lower alkenyl group; $R^2$ is an $-OXSO_3^-$ group or an

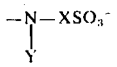

group wherein X is an alkylene group or an alkenylene group, and Y is a hydrogen atom, an alkyl group, an alkenyl group, an aryl group, an acyl group, or an $-OXSO_3^-$ group; $R^3$ is a hydrogen atom, a halogen atom, an alkyl group, an alkenyl group, a hydroxy group, an alkoxy group, an alkylthio group, a carboxy group, an alkoxycarbonyl group, an alkoxycarbonylamino group, or an acylamino group; and *p* is an integer of 1 or 2.

DETAILED DESCRIPTION OF THE INVENTION

The dyes as used herein as described above are represented by the following formula (I):

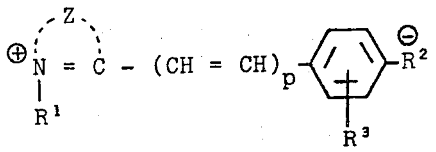
(I)

Z is a group of atoms required for forming an indolenine nucleus or a benzindolenine nucleus. The benzindolenine nucleus can be either the α-isomer or the βisomer. The indolenine or benzindolenine nucleus can be unsubstituted or substituted with one or more halogen atoms (for instance, a chlorine atom, a bromine atom, or the like), alkyl groups containing 1 to 4 carbon atoms (for instance, a methyl group, an ethyl group, and the like), alkoxy groups containing 1 to 4 carbon atoms (for instance, a methoxy group, a propoxy group, and the like), hydroxy groups, carboxy groups, alkoxycarbonyl groups containing an alkoxy group having 1 to 4 carbon atoms in the alkoxy moiety thereof (for instance, an ethoxycarbonyl group, and the like), amino groups, alkylamino groups containing 1 to 4 carbon atoms in the alkyl moiety thereof (for instance, an ethylamino group, a butylamino group, and the like), dialkylamino groups containing 1 to 4 carbon atoms in the alkyl moieties thereof (for instance, a dimethylamino group, a diisopropylamino group, and the like), or acylamino groups containing 1 to 5 carbon atoms in the alkyl moiety thereof (for instance, an acetylamino group, a pivaloylamino group, and the like).

$R^1$ is a lower alkyl group containing 1 to 4 carbon atoms such as a methyl group, an ethyl group, a butyl group, and the like, or a lower alkenyl group containing 1 to 4 carbon atoms such as an allyl group, a methallyl group, and the like.

$R^2$ is an $-OXSO_3^-$ group or an

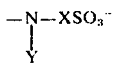

group wherein X is an alkylene group containing 2 to 5 carbon atoms such as an ethylene group, a butylene group, and the like, or an alkenylene group containing 2 to 5 carbon atoms such as a propenylene group, and the alkylene and alkenylene groups can be straight chain or branched chain, and Y is a hydrogen atom, an alkyl group containing 1 to 8 carbon atoms [(for instance, an unsubstituted alkyl group such as a methyl group, an ethyl group, an amyl group, an octyl group, and the like); or a substituted alkyl group having as a substituent, for instance, a halogen atom (such as a chlorine atom or a bromine atom), a cyano group, a hydroxy group, a carboxy group, an alkoxy group containing 1 to 4 carbon atoms (such as a methoxy group, an ethoxy group, a butoxy group, and the like), an alkoxycarbonyl group (e.g., containing the alkoxy group as described above), an acyl group containing 1 to 5 carbon atoms in the alkyl moiety thereof (such as an acetyl group, a propionyl group, a pivaloyl group, and the like), or an acyloxy or acylamino group (e.g., containing the acyl group as described above), an alkylsulfonylamino group containing 1 to 4 carbon atoms in the alkyl moiety thereof, an acetylacetoxy group, a phenoxyacetoxy group, an alkylsulfonyl or alkylsulfonyloxy group containing 1 to 4 carbon atoms in the alkyl moiety thereof, an alkylthio group containing 1 to 4 carbon atoms in the alkyl moiety thereof (such as a methylthio group, an ethylthio group, a butylthio group, and the like), an alkoxycarbonyloxy group containing the alkoxy group as described above (such as a methoxycarbonyloxy group, an ethoxycarbonyloxy group, and the like), an aryl group, e.g., an unsubstituted aryl group (such as a phenyl group), or a substituted aryl group (such as a phenyl group substituted with, for instance, an alkyl group containing 1 to 4 carbon atoms (such as a methyl group, an ethyl group, a butyl group, and the like), or an alkoxy group containing 1 to 4 carbon atoms (such as a methoxy group, a propoxy group, and the like))]; an alkenyl group containing 2 to 8 carbon atoms (for instance, an allyl group, a methallyl group, and the like), an aryl group, [e.g., an unsubstituted aryl group (such as a phenyl group, a naphthyl group, and the like) or a substituted aryl group, for instance, an aryl group substituted with an alkyl group (for instance, a methyl group, an ethyl group, a butyl group, and the like) or alkoxy group containing 1 to 4 carbon atoms (for instance, a methoxy group, an ethoxy group, a butoxy group, and the like), or a halogen atom (such as a chlorine atom, a bromine atom); an acyl group (such as an acetyl group, a valeryl group, a pivaloyl group), an alkylsulfonyl or arylsulfonyl group (such as a methylsulfonyl group, an ethylsulfonyl group, a benzenesulfonyl group, and the like)]; or groups having the same meanings as those defined by $—XSO_3^-$ (such as sulfoethyl group, a sulfobutyl group, a sulfoallyl group, and the like), and wherein $—XSO_3^-$ and Y can be the same or different.

$R^3$ is a hydrogen atom, a halogen atom (such as a chlorine atom, a bromine atom, and the like), an alkyl group containing 1 to 4 carbon atoms (for instance, a methyl group, an ethyl group, a butyl group, and the like); an alkenyl group containing 2 to 4 carbon atoms (for instance, an allyl group, a methallyl group, and the like), a hydroxy group, an alkoxy group (for instance, a methoxy group, an ethoxy group, a butoxy group, and the like) or an alkylthio group containing 1 to 4 carbon atoms in the alkyl moiety thereof (for instance, a methylthio group, an ethylthio group, a butylthio group, and the like), a carboxy group, an alkoxycarbonyl group (for instance, an ethoxycarbonyl group) or alkoxycarbonylamino group (for instance, an ethoxycarbonylamino group), each containing 1 to 4 carbon atoms in the alkoxy moiety thereof, or an acylamino group containing 1 to 5 carbon atoms in the alkyl moiety thereof (for instance, an acetylamino group, a propionylamino group, a methylsulfonylamino group, a propylsulfonylamino group, and the like).

*p* is an integer of 1 or 2.

Styryl or phenylbutadienyl dyes as used herein can be produced by condensing sulfo group-containing aldehyde compounds represented by the following formula (II) and 2-methylindolenine or 2-methylbenzindolenine derivatives represented by the formula (III):

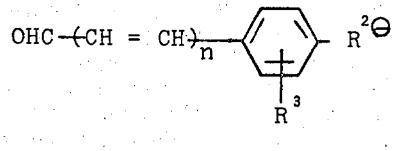
(II)

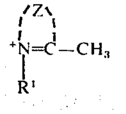
(III)

wherein *n* is 0 or 1, and $R^1$, $R^2$, $R^3$, and Z are as defined above.

The condensation reaction is preferably carried out in a solvent which is capable of dissolving the above-described starting materials of the formulas (II) and (III). Appropriate solvents are water, alcohols such as methanol, ethanol, isopropanol, and the like, ethylene glycol monoalkyl ethers such as ethylene glycol monomethyl ether, and the like, amides such as acetamide, dimethylformamide, and the like, carboxylic acids such as formic acid, acetic acid, and the like, etc. These solvents can be used individually or in combination with each other.

This reaction is preferably carried out at a temperature ranging from about 0°C to the boiling point of the solvent used. To accelerate the reaction, pyridine, piperidine, diethylamine, triethylamine, acetic acid, potassium acetate, and the like are preferably added. The reaction period is generally about 10 minutes to 24 hours. The mixing ratio of the aldehyde compounds represented by the formula (II) and the indolenine or benzindolenine derivatives represented by the formula (III) preferably is equimolecular, and in some cases, one of the reactants can be added in excess, for instance, in an amount two times larger than the other reactant.

The aldehyde compounds represented by the formula (II) can be produced by any known methods. For example, the compound of the formula (II) where *n* is zero, can be produced by the method disclosed in British Pat. No. 456,534, that is, the corresponding N-(hydroxyalkyl)aniline is subjected to formylation and halogenation using phosphorous oxychloride and N,N-dimethylformamide, and the resulting N-(haloalkyl-)aminobenzaldehyde is subjected to a Strecker reaction by the action of sodium sulfite or ammonium sulfite, whereby the corresponding N-(sulfoalkyl-)aminobenzaldehyde can be synthesized. Likewise, this compound can be produced by effecting the formylation of the corresponding N-(sulfoalkyl)aniline using a known method as described in *Berichte*, Vol. 60, page 119 (1927) or British Pat. No. 794,885.

The aldehyde compound of the formula (II) where *n* is 1, can be produced by the method as described in *Berichte*, Vol. 91, page 850 (1958) or ibid., Vol. 61, page 2074 (1928).

The indolenine or benzindolenine derivatives represented by the formula (III) can be synthesized by producing quaternary salts of the corresponding bases using known methods. Typical agents for producing these quaternary salts are alkyl halides such as methyl iodide, ethyl iodide, butyl iodide, and the like, and the corresponding bromides and chlorides; dialkylsulfates such as dimethylsulfate, diethylsulfate, and the like; alkylarylsulfonates such as methyl-p-toluenesulfonate, ethyl-p-toluenesulfonate, and the like; and alkylthiocyanates such as ethylthiocyanate, and the like.

Representative examples of dyes which can be used in the present invention are shown below but the present invention is not to be construed to be limited to these specific examples.

Examples of Dyes of the Formula (I)

I-1

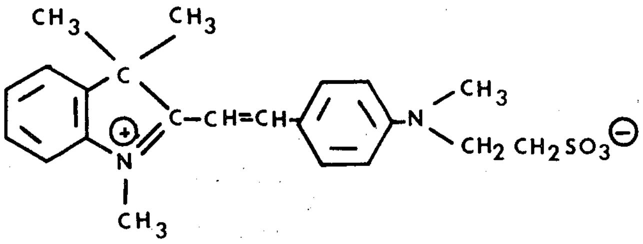

$\lambda_{max}^{methanol}$ = 541 nm

I-2

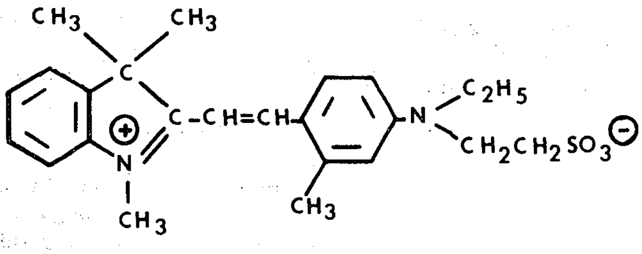

$\lambda_{max}^{methanol}$ = 554 nm

I-3

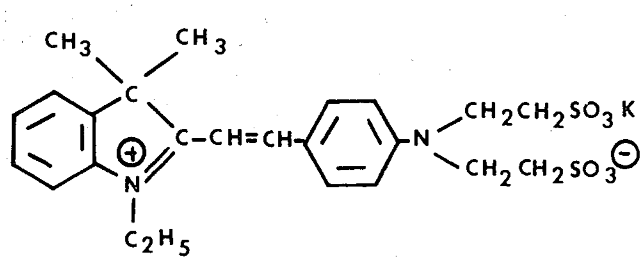

$\lambda_{max}^{methanol}$ = 535 nm

I-4

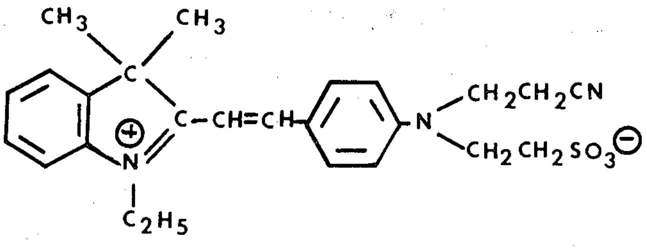

$\lambda_{max}^{methanol}$ = 542 nm

I-5

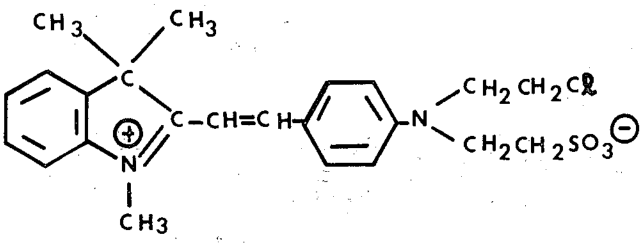

$\lambda_{max}^{methanol}$ = 535 nm

I-6
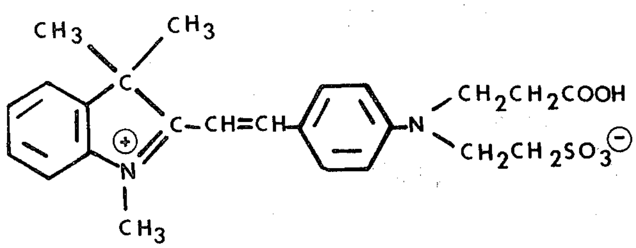
$\lambda_{max}^{methanol} = 534$ nm
I-7
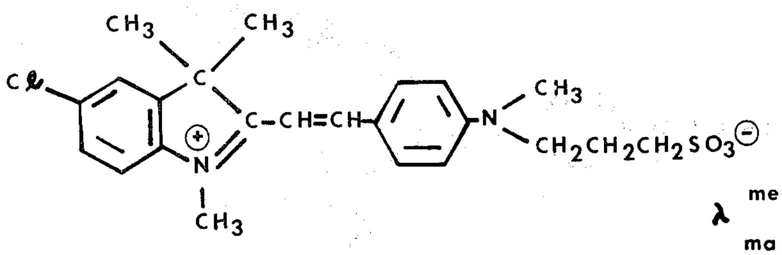
$\lambda_{max}^{methanol} = 548$ nm
I-8
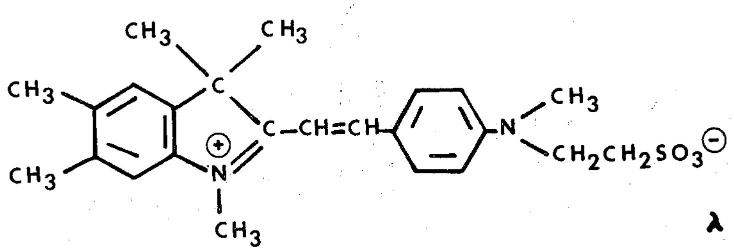
$\lambda_{max}^{methanol} = 532$ nm
I-9
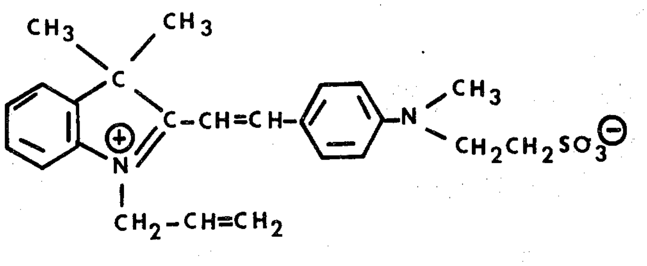
$\lambda_{max}^{methanol} = 543$ nm
I-10
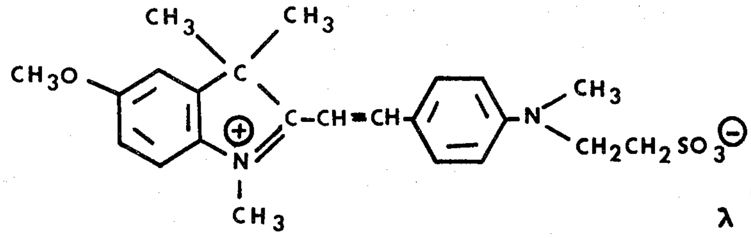
$\lambda_{max}^{methanol} = 532$ nm
I-11
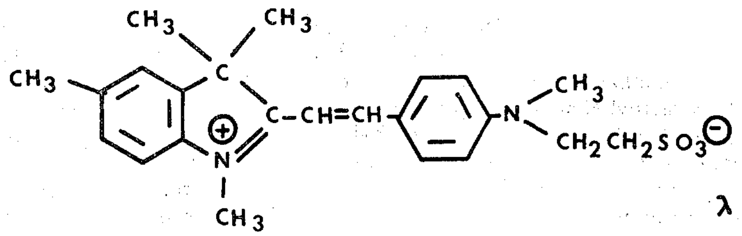
$\lambda_{max}^{methanol} = 536$ nm
I-12
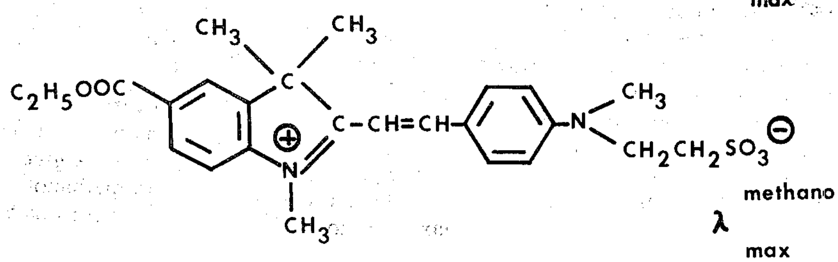
$\lambda_{max}^{methanol} = 555$ nm

I-13

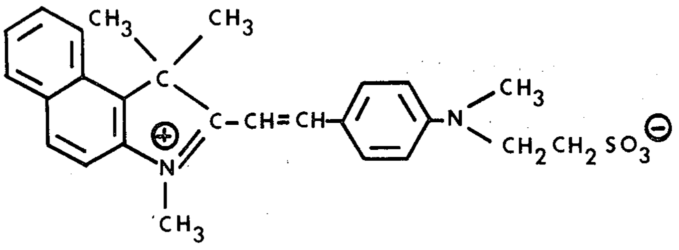

$\lambda_{max}^{methanol} = 572$ nm

I-14

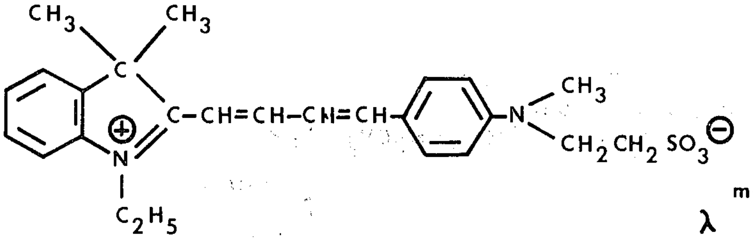

$\lambda_{max}^{methanol} = 629$ nm

I-15

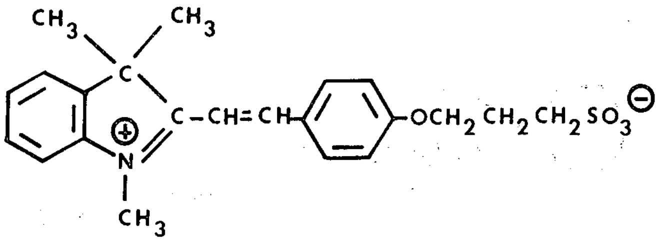

$\lambda_{max}^{methanol} = 430$ nm

I-16

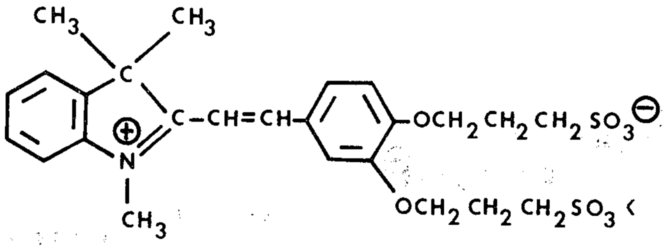

$\lambda_{max}^{methanol} = 449$ nm

Examples of the synthesis of the dyes of the formula (I) are shown below. Unless otherwise indicated herein, all parts, percents, ratios and the like are by weight.

PREPARATION EXAMPLE 1

Dye I-1

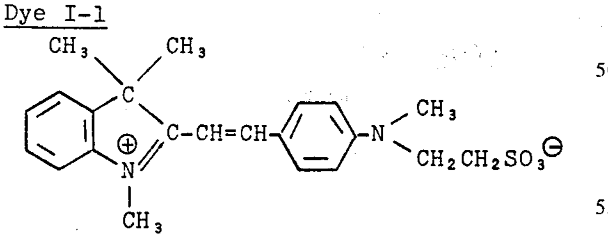

In 15 g of triethylamine and 150 ml of methanol were dissolved 39 g of a sodium salt of 4-(N-methyl-N-sulfoethyl)aminobenzaldehyde and 42 g of 1,2,3,3-tetramethylindolenium bromide by heating. In addition, 18 ml of glacial acetic acid was added, and the resulting solution was heated under reflux on a water bath for 2 hours. After the solvent was distilled away, 500 ml of water was added. The solution was stirred while heating, and the crystals precipitated were filtered. The crystals were washed with acetone and recrystallized from a mixed solvent of methanol and isopropanol (10:3 by volume). Thus 39 g of crystals were obtained which were bright dark-green. The solution of this dye in methanol was red, and its maximum absorption wavelength was 541 nm.

PRERPARATION EXAMPLE 2

Dye I-4

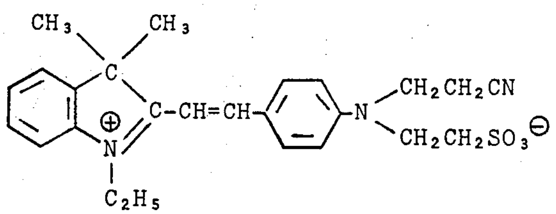

In 200 ml of methanol and 7 g of triethylamine was dissolved 26.8 g of 1-ethyl-2,3,3-trimethylindolenium bromide. To the resulting solution was added a solution prepared by dissolving 34 g of a sodium salt of 4-(N-2'-cyanoethyl-N-2'-sulfoethyl)aminobenzaldehyde in 80 ml of water, and subsequently 10 g of glacial acetic acid. The mixture was stirred and heated under relux. The reaction solution was then concentrated to one third the volume, and 150 ml of water was added to the concentrate. The resulting solution was stirred at 50°C for 20 minutes, and the thus-obtained crystals were filtered under suction. The crystals were washed with 100 ml of water and then with 100 ml of acetone, and were recrystallized from methanol. Thus, 39.2 g of the desired produce, which was dark green, was obtained. The solution of this dye in methanol was red, and its maximum absorption wavelength was 542 nm.

PREPARATION EXAMPLE 3

Dye I-7

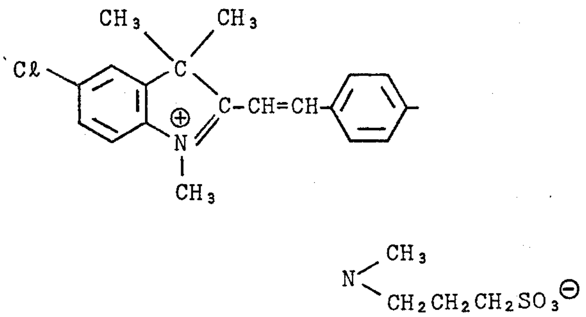

To 150 ml of methanol was added 45 g of 1,2,3,3-tetramethyl-5-chloroindolenium iodide, and 17 g of triethylamine was added to the resultihg solution and fully dissolved therein. Subsequently, a solution prepared by dissolving 38 g of a potassium salt of 4-[N-methyl-N-(γ-sulfopropyl)]aminobenzaldehyde in 70 ml of water was added to the solution and furthermore 20 ml of glacial acetic acid was added. The solution so prepared was heated under reflux for 1 hour. After being allowed to stand for one night, the solution was added to 200 ml of water while stirring the solution to precipitate crystals. The crystals were filtered and recrystallized from methanol, and thus green crystals were obtained in a yield of 37 g.

The solution of this dye in methanol was red and its maximum absorption wavelength was 548 nm.

PREPARATION EXAMPLE 4

Dye I-13

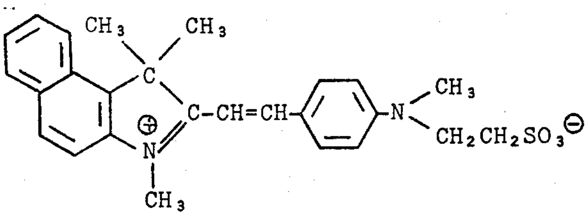

To 200 ml of methanol and 20 g of triethylamine were added 35 g of 1,2,3,3-tetramethyl-1H-benz(e) indolenium iodide and 30 g of a sodium salt of 4-[N-methyl-N-(3-sulfoethyl)]-aminobenzaldehyde, and the mixture was heated under reflux for 1 hour. The reaction solution was then concentrated to one third the volume, and the concentrate was added to 200 ml of water with stirring to precipitate crystals. The crystals so-obtained were filtered, pulverized, washed in 300 ml of water, and filtered. The crystals were recrystallized from a 1:1 by volume mixed solvent of methanol and isopropanol and thus green crystals were obtained in a yield of 42 g. The solution of these crystals in methanol was red, and its maximum absorption wavelength was 572 nm.

PREPARATION EXAMPLE 5

Dye I-14

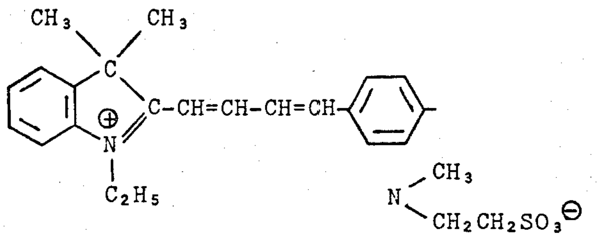

To 50 ml of methanol were added 4.2 g of 1-ethyl-2,3,3-trimethylindolenium bromide and 3.9 g of the ammonium salt of 4-(N-methyl-N-sulfonyl)aminocinnamaldehyde followed by the addition of 5 drops of piperidine, and the resulting solution was heated under reflux on a water bath for 40 minutes. The solvent was distilled off until just before the precipitation of crystals, and after cooling, the crystals precipitated were filtered. The crystals so obtained were pulverized, dipped in 50 ml of water for 20 minutes, filtered, and recrystallized from methanol. Thus, green crystals were obtained in a yield of 4.0 g. The solution of this dye in methanol was red, and its maximum absorption wavelength was 629 nm.

PREPARATION EXAMPLE 6

Dye I-15

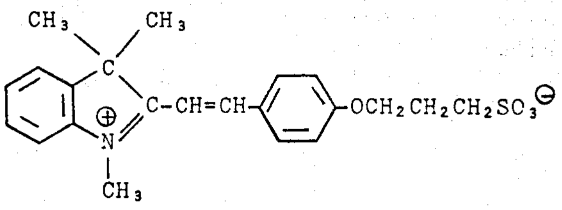

To 20 ml of methanol and 2 g of triethylamine were added 5.1 g of 1,2,3,3-tetramethylindolenium bromide and 5.6 g of 4-(γ-sulfopropyloxy)benzaldehyde, and furthermore 2.5 g of glacial acetic acid was added. The mixture so a prepared was concentrated to one fourth of its original volume, and 100 ml of water was added to the concentrate. This mixture was heated at 50°C for 10 minutes. The crystals precipitated were filtered under suction, and washed with 50 ml portions of water and acetone. The crystals so obtained were recrystallized from a 1:1 by volume mixed solvent of methanol and isopropanol to yield 6.2 g of yellow-orange crystals.

The solution of this dye in methanol was yellow, and its maximum absorption wavelength was 430 nm.

The light-sensitive member of the present invention comprises a support, at least one silver halide emulsion layer on one side of the support, and at least one layer containing a binder and at least one dye represented by the formula (I) on the other side of the support.

As the binder for use in preparing the colored backing layer of the present invention, any polymers which have been hitherto known to be suitable for this purpose, are soluble in low boiling organic solvents, and are soluble in an alkaline solution, can be used. For instance, a copolymer of acrylic acid (or methacrylic acid) and an acrylic acid ester (or methacrylic acid ester), an acrylonitrile-maleic acid copolymer, a vinyl acetate-maleic acid copolymer, a styrene-maleic acid copolymer, cellulose acetate phthalate, hydroxypropylmethylcellulose phthalate, polycondensation products of formaldehyde and aromatic organic acids, e.g., cresol, salicylic acid, p-oxybenzoic acid, p-oxyphenylacetic acid, or the like, alkali decomposition products of shellac as described in Japanese Pat. No. 3,739/1938, carbonates as described in Japanese Pat. No. 4,378/1959, alginic acid nitrate as described in Japanese Pat. No. 6,043/1957, can be used individually or in mixtures comprising two or more thereof.

The backing layer of the present invention can be provided on the support using any generally known method. That is, an appropriate amount of the dye of the formula (I) is dissolved in an alcohol solution containing a polymer binder in an appropriate concentration, or an alcohol solution containing an appropriate concentration of the dye of the formula (I) is added to a binder containing alcohol solution so that the predetermined dye concentration can be obtained, and the thus-obtained coating solution for the backing layer can be coated on the support using known methods.

Alcohols, ketones, or esters can be used as the solvent and of these solvents, alcohols are preferred. These alcohols include alcohol derivatives such as methoxyethanol, ethoxyethanol, and the like as well as methanol, ethanol, isopropanol, n-propanol, and the like. They can be used individually or in combination with each other.

As the support, glass plates comprising soda glass, potash glass, borosilicate glass, silica glass, or the like; films of synthetic polymers such as polyalkyl(meth)acrylate, polystyrene, polyvinyl chloride, partially formalated polyvinyl alcohol, polycarbonate, polyesters, e.g., polyethylene terephthalate, polyamides, e.g., nylon, or the like, or semi-synthetic polymers such as cellulose acetate, cellulose nitrate, or cellulose acetate butyrate; paper, paper coated with baryta, paper coated with an α-olefin polymer, a synthetic paper comprising polystyrene and the like; and other transparent or opaque supports used as a photographic element, such as ceramics, metal, and the like, can be used. The backing layer of the present invention is more effectively applied to transparent supports although the present invention is not restricted thereto.

In coating the coating solution for the backing layer on the support, those methods known as methods for coating layers of a photographic member, such as napkin coating, dip coating, curtain coating, extrusion coating, and the like can be used.

The backing layer of the present invention can contain, in addition to the dyes represented by the above formula (I), other hitherto known dyes or pigments within the limits that the backing layer is not materially adversely affected. Examples of pigments, which can be used in combination with the dyes of the present invention, include, for example, carbon black, and dyes which can be used in combination with the dyes of the formula (I) include triphenylmethane dyes as described in Belgian Pat. No. 632,536; Japanese Pat. Nos. 5,731/1953 and 8,535/1957; and U.S. Pat. No. 3,382,074, and oxonol dyes as described in Japanese Pat. No. 18,459/1966, although the present invention is not intended to be limited thereto and other dyes can be employed.

The backing layer of the present invention can contain various other additives such as an antistatic agent, a matting agent, a slipping agent, and the like as well as the binder and dyes. For example, 1-benzyl-2-alkylbenzimidazole sulfonic acid, antistatic agents as described in Japanese Pat. No. 4,873/1953, matting agents as described in Japanese Pat. Nos. 1,716/1964 and 10,767/1968, slipping agents such as stearic acid amide, sodium dioctysulfosuccinate, or the like can be used.

The backing layer of the present invention need not necessarily be a single layer and can comprise two or more layers. The composition of each layer can be varied greatly. That is, those factors such as hue and color density of the colored layer, kind and content of the dyes and the like to be used, kind of the binder to be used, thickness of the layer, kind and content of the additives in each layer, and the like can be varied greatly. Some of these layers can be colorless. For instance, the backing layer of the present invention can be provided as the layer which is closest to the support of a plurality of layers, or can be provided as the layer which is farthest from the support, that is, the outermost layer. Where three or more layers are provided, the layer of the present invention can be interposed between the other layers. More specifically, an under-coating layer is provided on the support in order to improve the adhesion between the backing layer and the support, and the backing layer of the present invention can be provided on the under-coating layer. Alternatively, the backing layer of the present invention can be first provided on the support and an upper layer which is colorless, colored, or matted, can be then coated on the backing layer.

Silver halide photographic emulsions for use in producing the photographic member of the present invention can be prepared by various known methods so as to provide properties suitable for the use of the photographic member.

Suitable silver halides include silver chloride, silver chlorobromide, silver bromide, silver iodobromide, silver iodochlorobromide, and the like, and the halogen content is not limited. Suitable protective colloids for use in forming a binder or silver halide precipitate include gelatin derivatives such as acrylated gelatin, e.g., phthalated gelatin, succinated gelatin, and the like, and grafted gelatin, e.g., those wherein acrylamide, hydroxyalkyl(meth)acrylate, or the like is grafted to gelatin; and synthetic polymers such as copolymers comprising three types of monomers, acrylic acid (or methacrylic acid), acrylamide (or methacrylamide), and an amine derivative thereof (for example, N-(dialkylaminoalkyl)acrylamide) and these can be used individually or in combination with each other.

The preparation of the silver halide emulsion can be carried out using known methods. For example, those techniques and methods as described in, for example, C. E. K. Mees & T. H. James, *The Theory of the Photographic Process*, 3rd Edition, MacMillan Co., New York (1966); P. Grafkides, *Chimie Photographique*, 2nd Edition, Photocinema Paul Montel, Paris (1957); H. Frieser, *Die Grundlagen der Photographische Prozesse mit Silberhalogeniden*, Vol. 2, pages 609 to 674, and pages 735 to 743, Akademische Verlaggesellschaft, Frankfurt-am-Main (1968), can be used, Any one of an acid method, a neutral method, or an ammonia method can be used, and a single jet method or a double jet method (also called a twin jet method) can be used. The so-called controlled double jet method as described in *Berichte der Bunsengesellschaft fur*

*Physikalische Chemie*, Vol. 67, page 349 (1963), can be employed, if desired. These methods are effective in producing emulsions having a quite narrow grain size distribution. The form of the silver halide grains can be either cubic, octahedral, or tetradecahedral, or in various twins, or as mixtures thereof. The silver halide emulsion can comprise either coarse grains or fine grains. The average diameters (number average value measured by the projection method) or edge lengths of these grains (or corresponding values indicating the grain size) can be either less than about 0.2 $\mu$m, about 0.2 to 1 $\mu$m, or more than about 1 $\mu$m. The grain size distribution (the grain size has the meanings as described above) can be either narrow or broad.

The practical value of the backing layer of the present invention is high particularly when an emulsion comprising superfinely divided grains of an average grain size of not more than about 0.1 $\mu$m, preferably not more than 0.08 $\mu$m (generally called a Lipmann type emulsion) is used. The reason for this is that since a layer comprising such a silver halide emulsion is nearly transparent and the percentage of the light transmitted by the emulsion layer is large, the layer is readily subject to halation, and thus the effect of an antihalation layer is particularly important, and that a light-sensitive member produced using such a superfinely divided particle emulsion is often subjected to supersonic cleaning in halogenated hydrocarbons.

The silver halide emulsion can be either physically ripened or not physically ripened. After the formation of the precipitate or the physical ripening, soluble salts are generally removed from the emulsion. Methods for this removal include noodle water-washing, which has been known for a long time, and a flocculation method utilizing inorganic salts containing polyvalent anions (for example, ammonium sulfate), anionic surface active agents, anionic polymers, or acylated gelatin.

The silver halide emulsion can be either chemically sensitized or not chemically sensitized. A non-chemically sensitized emulsion is a so-called non-ripened emulsion. Chemical sensitization can be carried out using various known methods. That is, sulfur sensitization using an unstable sulfur compound or active gelatin; reduction sensitization using a reducing material, e.g., amines, stannous chloride, and the like; gold sensitization using a gold complex salt, e.g., a gold thiocyanic said complex salt, a gold thiosulfuric acid complex salt, and the like; sensitization using palladium, iridium, or other metal salts; sensitization using a selenium compound; or combinations thereof can be used.

The photographic emulsion for use in the light-sensitive member of the present invention can be spectrally sensitized to longer wavelength blue length, green light, red light, or infrared light using optical sensitizers. Sensitizers which can be used, include cyanine dyes, merocyanine dyes, complex cyanine dyes, complex merocyanine dyes, holopolar cyanine dyes, styryl dyes, hemicyanine dyes, oxonol dyes, hemioxonol dyes, and the like. The cyanine dyes can be any of those which contain, as a basic nucleus, heterocyclic rings such as pyrroline, oxazoline, thiazoline, pyrrole, oxazole, thiazole, selenazole, imidazole, pyridine, or the like. These nuclei can be unsubstituted or can contain, as substituents, an alkyl group, an alkylene group, a hydroxyalkyl group, a carboxyalkyl group, a sulfoalkyl group, an aminoalkyl group, an alkoxyalkyl group, a sulfohydroxy-alkyl group, a sulfoalkoxyalkyl group, and the like. These nuclei can combine with hydrocarbon rings or heterocyclic rings which may be unsubstituted or substituted with halogen atoms, alkyl groups, alkoxy groups, hydroxy groups, cyano groups, carboxy groups, alkoxycarbonyl groups, alkylamino groups, dialkylamino groups, acylamino groups, phenyl groups, fluoroalkyl groups, or the like. The cyanine dyes can be either symmetric or non-symmetric, and their methine and polymethine chains can be substituted with alkyl groups, phenyl groups, substituted phenyl groups such as a carboxyphenyl group, isophorone nuclei, or heterocyclic ring nuclei. As merocyanine dyes, those dyes can be used which contain the above-described basic nuclei and, as an acid nucleus, acid nuclei such as 2-thiaoxazolidinedione, rhodanine, thiohydantoin, barbituric acid, or thiobarbituric acid, or $$-CO\underset{A}{\underset{|}{C}}HCN \text{ group}$$

(wherein A is an electron attractive group). These acid nuclei can be unsubstituted or substituted with alkyl groups, alkylene groups, phenyl groups, hydroxyalkyl groups, carboxyalkyl groups, sulfoalkyl groups, alkoxyalkyl groups, or acylamino groups, or heterocyclic nuclei. These sensitizers can be used individually or in combination with each other. A large number of combinations of these sensitizers for supersensitization are also known.

The emulsion can contain, together with the sensitizers, compounds which exhibit supersensitization action without substantially absorbing visible light, such as compounds containing a pyrimidylamino group or a triazinylamino group as described in U.S. Pat. Nos. 2,933,390, 3,511,664, 3,615,613, 3,615,632, 3,615,641, etc., aromatic organic acid-formaldehyde condensates, azaindenes, or cadmium salts as described in British Pat. No. 1,137,580, etc.

To the photographic emulsion of the light-sensitive member of the present invention, various compounds can be added in order to prevent fog during production, during storage, or during development of the photosensitive member, or to stabilize its photographic capability. For example, azoles, e.g., benzthiazole, benztriazole, and the like; halogen or nitro-substituted azoles; mercaptoazoles, e.g., mercaptoimidazole, mercaptotetrazole, and the like; mercaptoazines, e.g., mercaptopyrimidine, and the like; thiosalicylic acid or other mercapto compounds; oxazoline-2-thione or other heterocyclic thiones; azaindenes, e.g., tetrazaindene, pentazaindene, and the like; nitrogen-containing heterocyclic compounds, e.g., aminohydroxypyrimidine, urazole, and the like, etc., can be used. In addition, benzenesulfinic acid, benzenethiosulfonic acid, sugar mercaptal, or sulfinamide as described in Japanese Pat. No. 4,136/1968 can be used.

Furthermore, the photographic emulsion can contain polyalkyleneoxide or derivatives thereof, quaternary ammonium compounds, amphoteric surface active agents, or thioether compounds for the purpose of increasing its sensitivity.

To the photographic emulsion for use in the light-sensitive member of the present invention, inorganic or organic mercury compounds can be added for the purpose of sensitization or anti-fogging. For example, mercury complex salts as described in U.S. Pat. No. 2,728,664; a benzthiazole mercury salt as described in U.S. Pat. No. 2,728,667; mercury salt adducts as described in, for example, U.S. Pat. Nos. 2,728,663 and 2,732,302; and organic mercury compounds as described in, for example, U.S. Pat. Nos. 2,728,665 and 3,420,668, can be used.

Furthermore, to the photographic emulsion, when the silver halide grain size or the value corresponding thereto is quite small, for example, less than about 0.4 μm or less than about 0.2 μm, those compounds as described in British Pat. Nos. 1,316,493, 1,317,138, 1,317,139, 1,317,709, 1,297,901, and West German Pat. OLS No. 2,235,031 can be added.

In the light-sensitive member of the present invention, the photographic emulsion layer and other hydrophilic colloidal layers can be hardened by adding commonly used hardening agents. These hardening agents include aldehydes such as glyoxal, and the like; diketones such as diacetylethane; N-methylol such as N,N'-dimethylol urea; dioxane derivatives such as 2,3-dihydroxydioxane; epoxy group-containing compounds as described in U.S. Pat. Nos. 3,047,394, 3,091,537; and Japanese Pat. No. 7,133/1959; reactive halogen-containing compounds such as 2,4-dichloro-6-hydroxy-1,3,5-triazine; mucochloric acid or mucobromic acid, or derivatives thereof; bis(methanesulfonic acid ester); sulfonyl compounds such as bis(benzenesulfonylchloride); aziridine compounds as described in, for example, Japanese Pat. No. 8,790/1962; divinylsulfones as described in, for example, U.S. Pat. No. 2,579,871; reactive olefin containing compounds such as those compounds as described in, for example, German Pat. No. 872,153 and other divinylketones, or compounds containing at least two acryloyl groups; alkylenebismaleimides; isocyanates; carbodiimides; isooxazole derivatives; carbamoyl chloride derivatives; dialdehyde starch, those compounds as described in Japanese Pat. No. 12,550/1967, and other polymer hardening agents; inorganic hardening agents such as chromium alum, chromium acetate, zirconium sulfate, and the like; and the like.

Various kinds of well known surface active agents as auxiliary coating agents or for other purposes in the photographic emulsion layer and other hydrophilic colloidal layers can be added to the light-sensitive member of the present invention. For example, nonionic surface active agents such as saponin, polyethylene glycol, a polyethylene glycol-polypropylene glycol condensate, polyalkylene glycol ether, polyalkylene glycol ester, polyalkylene glycol amide, and the like; anionic surface active agents such as an alkylbenzenesulfonate, alkylnaphthalenesulfonate, alkylsulfonate, alkylcarboxylate, alkylsulfate, maleopimelic ester, N-acryl-N-alkyltaurine, or those compounds as described in U.S. Pat. Nos. 2,823,123 and 3,415,649; and amphoteric surface active agents such as those compounds as described in, for example, British Pat. No. 1,159,825, Japanese Pat. No. 378/1965, Japanese Patent Application OPI No. 43,924/1973, and U.S. Pat. No. 3,726,683, can be used.

Furthermore, the photographic emulsion layer and other hydrophilic colloidal layers can contain plasticizers, for example, gelatin which is well known, diols as described in U.S. Pat. No. 2,960,404, trivalent aliphatic alcohols as described in U.S. Pat. No. 3,520,694, and the like.

The hydrophilic colloidal layers can contain slipping agents such as higher alcohol esters of higher aliphatic acids, a silicone resin, a dispersion of liquid paraffin, and the like.

Synthetic polymers can be dispersed in the photographic emulsion layer and other hydrophilic colloidal layers in order to improve the dimensional stability. Water-insoluble polymers comprising monomers such as alkylacrylates, alkylmethacrylates, acrylic acid, acrylonitrile, sulfoalkylacrylates, sulfoalkylmethacrylates, and the like, or mixtures thereof, can be used as these synthetic polymers.

The hydrophilic colloidal layers can contain matting agents such as inorganic particles of silica, cadmium carbonate, zinc carbonate, strontium carbonate, and the like; or organic particles of starch, polystyrene, polymethylmethacrylates, and the like.

Moreover, the photographic emulsion layer and other hydrophilic colloidal layers can contain dyes. As these dyes, water-soluble dyes such as oxonol dyes or hemioxonal dyes containing a pyrazolone nucleus, a pyrrole nucleus, a barbituric acid nucleus, a pyrazolidinedione nucleus, or other acid nuclei which contain a carboxy group or a sulfo group as a water-soluble group, and styryl dyes or merocyanine dyes containing a water-solubilizing group in at least one nucleus of those which are bonded through a basic nucleus, and the basic nucleus and a methine chain; or dispersions of water-insoluble dyes such as dispersions of oxonol dyes, styryl dyes, merocyanine dyes, cyanine dyes, and the like which do not have water-solubilizing group, can be used.

In order to dye a specific hydrophilic colloidal layer selectively by the use of these dyes, mordants such as polymer mordants as described in, for example, British Pat. Nos. 685,475, 850,281, 906,083, 765,520, and 766,202, U.S. Pat. Nos. 2,839,401 and 3,445,231, West German Pat. OLS Nos. 1,914,361 and 1,914,362, and Japanese Patent Application OPI No. 24,733/1973 can be contained in the specific hydrophilic colloidal layer.

The photographic emulsion layer and other hydrophilic colloidal layers can contain ultraviolet light absorbents such as benzophenones, benzotriazoles, thiazolidines, and like compounds. These ultraviolet light absorbents can be introduced into the specific layer in the same manner as used in the introduction of the dyes.

The photographic emulsion layer and other hydrophilic colloidal layers can contain stilbene, triazine, oxazole, or cumarin fluorescent whitening agents, and these fluorescent whitening agents can be water-soluble. Water-insoluble fluorescent whitening agents can be also used in the form of a dispersion.

The photographic emulsion layer can contain those couplers which are usually used for forming non-diffusing color images. Color image forming couplers designate those compounds which react with oxidation products of aromatic primary amine developers at development to form dyes and which are hereinafter abbreviated as couplers. These couplers can be either four-equivalent or two-equivalent couplers. Colored couplers for color compensation or couplers liberating development inhibitors can be also used. As yellow couplers can be preferably used open chain ketomethylene type compounds such as acylaminoacetoamide based compounds, and as magenta couplers, pyrazolone based or cyanoacetyl based compounds, and as cyan couplers, naphthol based or phenol based compounds. These couplers can be introduced into the photographic emulsion layer using methods which are usually used in producing multi-color light-sensitive members.

The present invention can be employed in multi-layer multi-color photographic members which have at least two layers of different spectral sensitivities on a support. Multi-layer natural color photographic members have at least one layer of each of a red sensitive silver halide emulsion layer, a green sensitive silver halide emulsion layer, and a blue sensitive silver halide emulsion layer. The order of these layers can be varied at will according to the use. In general, cyan forming couplers are contained in the red sensitive silver halide emulsion layer, magenta forming couplers are contained in the green sensitive silver halide emulsion layer, and yellow forming couplers are contained in the blue sensitive silver halide emulsion layer. In some cases, however, these combinations can be changed.

The photographic emulsion layer and other hydrophilic colloidal layers can contain one or more of developers such as aromatic diols, e.g., hydroquinone, aminophenols, phenylenediamines, 3-pyrazolidones, ascorbic acid or derivatives thereof, and the like. The combination of hydroquinone and N-hydroxyalkyl substituted para-aminophenol derivatives as described in Japanese Pat. No. 43,814/1973 is particularly preferred. If these developers are water-insoluble, they can be added in the form of a dispersion.

The photographic emulsion layer and other hydrophilic colloidal layers can be coated using various coating methods. These coating methods include dip coating, air-knife coating, roller coating, curtain coating, and extrusion coating. The method as disclosed in U.S. Pat. No. 2,681,294 is a preferred method. Two or more layers can be coated at the same time using the methods as described in U.S. Pat. Nos. 2,761,791 and 3,526,528.

The light-sensitive member of the present invention can contain an antistatic layer or an electrically conductive layer, such as a vapor deposited or electrodeposited metal layer or a layer comprising an ionic polymer.

The light-sensitive member of the present invention can be processed using any known methods. Known processing solutions can be used. The processing can be carried out at temperatures of less than about 18°C, about 18° to 40°C, and more than about 40°C.

To the light-sensitive member of the present invention can be applied development processing (black and white photographic processing) for forming silver images, and color photographic processing for forming colored dye images.

Developers for use in subjecting the light-sensitive member of the present invention to black and white photographic processing can contain known developing agents. As these developing agents, dihydroxybenzenes such as hydroquinone, chlorohydroquinone, bromohydroquinone, 2,3-dichlorohydroquinone, methylhydroquinone, isopropylhydroquinone, 2,5-dimethylhydroquinone, and the like; 3-pyrazolidones such as 1-phenyl-3-pyrazolidone, 1-phenyl-4-methyl-3-pyrazolidone, 1-phenyl-4,4-dimethyl-3-pyrazolidone, 1-phenyl-5-methyl-3-pyrazolidone, and the like; aminophenols such as o-aminophenol, p-aminophenol, N-methyl-o-aminophenol, N-methyl-p-aminophenol, 2,4-diaminophenol, and the like; pyrogallol; ascorbic acid; 1-aryl-3-pyrazolines such as 1-(p-hydroxyphenyl)-3-aminopyrazoline, 1-(p-methylaminophenyl)-3-aminopyrazoline, 1-(p-aminophenyl)-3-aminopyrazoline, 1-(p-amino-m-methylphenyl)-3-aminopyrazoline, and the like; etc., can be used individually or in combination with each other. To the developer can be added, if desired, preservatives such as sulfites, bisulfites, ascorbic acid, and the like; alkali agents such as hydroxides, carbonates, and the like; pH buffers such as carbonates, borates, boric acid, acetic acid, citric acid, alkanolamines, and the like; auxiliary solvents such as polyethyleneglycols, or esters thereof, alkanolamines, and the like; sensitizers such as non-ionic surface active agents containing a polyoxyethylene chain, quaternary ammonium compounds, and the like; surface active agents; defoaming agents; antifoggants such as halides, e.g., potassium bromide, sodium bromide, and the like; benztriazole, benzthiazole, tetrazoles, thiazoles, and the like; chelating agents such as ethylenediaminetetraacetic acid, or the alkali metal salts thereof, nitrilotriacetic acid salts, polyphosphoric acid salts, and the like; development accelerators such as those compounds as described in Japanese Pat. No. 45,541/1962; hardening agents such as glutaraldehyde, and the like; etc.

As a specific developing method, a method which comprises processing a light-sensitive member, which contains a developer in, for example, an emulsion layer thereof, in an alkaline aqueous solution to effect development thereof, can be employed. Such a developing method is often utilized as a rapid processing method of the light-sensitive member in combination with silver salt stabilizing processing using thiocyanate salts, and such a processing is possible. In such a rapid processing, the effect of the present invention is markedly large.

As the fixing solution, generally used compositions can be used. The fixing solution is generally an aqueous solution comprising a fixing agent, a hardening agent, and the like, and the pH is generally about 3.8 to 5.0. Those organic sulfur compounds which are capable of forming soluble and stable silver complex salts, as well as thiosulfuric acid salts such as sodium thiosulfate, potassium thiosulfate, ammonium thiosulfate, and the like, and thiocyanates such as sodium thiocyanate, potassium thiocyanate, ammonium thiocyanate, and the like can be used as the fixing agent.

In general, water-soluble aluminum salts such as aluminum chloride, aluminum sulfate, potassium alum, and the like, which act as hardening agents, are added to the fixing solution.

Conventional methods can be used in forming color images. For example, a nega-posi method as described in *Journal of the Society of Motion Picture and Television Engineers*, Vol. 61 (1953), pages 667 to 701, a color reversal method comprising applying an imagewise exposure, developing with a developer containing a black and white developing agent to produce a negative silver image, applying at least one uniform exposure (or another appropriate fogging treatment), and effecting color development to produce color positive images, or a method of obtaining color positive images using a direct positive emulsion, etc., can be used.

A color developer is an alkaline aqueous solution generally containing a color developing agent. Examples of color developing agents include known primary aromatic amine developing agents such as phenylenediamines, e.g., N,N-diethyl-p-phenylenediamine, N-ethyl-N-(β-hydroxyethyl)amino-2-methylaniline, 4-(N-ethyl-N-β-methanesulfoneamidoethyl)amino-2-methylaniline, N,N-diethylamino-2-ethoxyaniline, and the like, and p-aminophenols, e.g., 4-aminophenol, 2,6-dichloro-4-aminophenol, 2-bromo-4-aminophenol, and the like, etc. The color developer can further contain generally used additives such as sulfites, carbonates, bisulfites, bromides, and iodides of alkali metals, and alkaline buffer agent, and the like. Furthermore, if desired, a dye forming coupler, a competitive coupler, an antifogging agent, a hardening agent, an antioxidant, a tackifier, and the like can be added.

The quantity of the dye to be present in the backing layer of the present invention is determined in order that the absorption density required by the backing layer can be obtained. In general, the dye of the formula (I) is employed in an amount corresponding to an area density ranging from about 0.1 mg to about 20 mg per 100 $cm^2$.

The quantity of the dye to be employed in the coating solution for forming the backing layer is determined so that the desired area density of the dye can be obtained when various conditions such as the thickness of the backing layer to be formed, the coating amount of the coating solution, the concentration of the binder in the coating solution, the viscosity of the coating solution, and the like are selected so that they are suitable for the coating method and drying method employed, taking into consideration the solubility of the dye in the coating solution. In general, it is preferred that the concentration of the binder in the coating solution is about 10 to 60 g/l, and the concentration of the dye is about 1 to 12 g/l. The thickness of the backing layer is generally about 1 $\mu$m or less, and can be made much thicker, if desired.

In accordance with the method of the present invention, a backing layer can be obtained which possesses light absorption density sufficient to prevent halation and light fog, to be able to distinguish the face, and to achieve other objects. This backing layer does not cause harmful effects such as desensitization, deterioration of latent images, increase in fog, and the like of the photographic emulsion layer when the backing layer or portions thereof are contacted with the photographic emulsion layer, provided that components other than the dye are suitably selected.

Even though the light-sensitive member of the present invention is subjected to cleaning or supersonic cleaning in a solution comprising chlorinated hydrocarbons such as 1,1,1-trichloroethane and perchloroethylene, the dye contained in the backing layer does not dissolve in the solution and does not color the solution. Therefore, even though a large number of light-sensitive members are processed in such a cleaning solution, coloration of the cleaning solution and contamination of the light-sensitive member, particularly the emulsion layer due to the coloration, do not result.

The backing layer of the present invention can be dissolved and removed by developing the light-sensitive member with an alkaline developer containing bisulfites, and the coloration of the developer due to the dye is not observed even after a large number of light-sensitive members are developed. A development inhibiting solution or fixing solution which is introduced together with a part of the developer, is free from the coloration even after a large number of light-sensitive members are processed.

Since the decoloration of the backing layer of the present invention in the developer is quite rapid as compared with prior art dyes, the light-sensitive member of the present invention is suitable even for a rapid development in which the period of development is 30 seconds or less.

Indoleninestyryl type dyes containing a sulfo group-substituted-alkoxy group or alkylamino group at the para position relative to the methine chain of the benzene nucleus, which are used in the present invention, are superior to those dyes of similar structures containing a sulfoalkyl group at the nitrogen atom of the indolenine nucleus, which are described in U.S. Pat. No. 3,384,487, in that the dyes of the present invention are highly soluble in alcohols and thus a backing layer of sufficiently high absorption density can be easily obtained.

The present invention will be explained in greater detail by reference to the following examples.

EXAMPLE 1

An undercoating was applied onto one side of a 15 cm × 15 cm glass plate. On the thus-processed glass plate was coated a silver iodobromide gelatin photographic emulsion (iodide content: 1 mol%; average particle size (number average): 0.06 $\mu$), which was subjected to orthochromatic sensitization by addition of a merocyanine dye; 3-($\beta$-carboxyethyl)-5-[$\beta$-(3-ethylthiazolinilidene) ethylidene]rhodanine iodide, in an area density of 4 $g/m^2$. The weight ratio of silver halide to gelatin in the emulsion was 1.1:1.0.

On the other side of the glass plate was coated a backing layer as follows. 60 g of a copolymer of methylmethacrylate and acrylic acid (molar ratio: 1:1) having a molecular weight of about 50,000 was dissolved in 2,400 ml of methanol, and the solution so prepared was divided into three equal portions. In these portions were dissolved dyes represented by the following formulae in an amount of 7 g in each case.

(A) Dye I-1

(B)

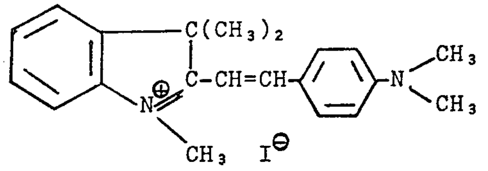

(C)

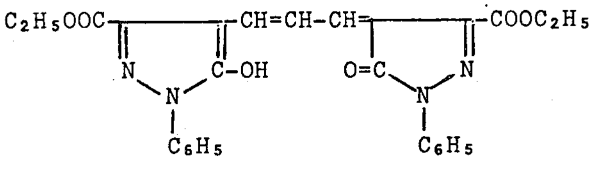

While feeding these solutions onto 5 cm × 15 cm pieces of silk cloth in an amount of 1 ml per minute, these silk pieces were contacted with the above glass surface (on which no emulsion was coated) moving at a speed of 1 m per minute.

Each of light-sensitive plates coated with the solutions containing each of the dyes was cut into 5 × 5 cm pieces, and all of the pieces were cleaned for 2 minutes by immersion in 40 ml of 1,1,1-trichloroethane at a temperature 50°C and by applying supersonic vibration of a frequency of 28 KHz and an output of 50 W thereto. With the sample A prepared using Dye(I-1), no coloration of the solution after the cleaning processing was observed at all. With the comparison samples (B) and (C) prepared using Dyes (A) and (B), the solutions turned pale orange.

The spectral absorption of each of the solution in the vicinity of a wavelength of 530 nm was measured using a measuring vessel with a light path of 1 cm, and the results obtained are shown below.

| Dyes Used in the Backing Layer | Wavelength | Absorption Density |
|---|---|---|
| | (nm) | |
| Sample A: Dye (I-1) | 542 | 0.00 |
| Sample B: Dye (A) | 520 | 0.03 |
| Sample C: Dye (B) | 545 | 0.06 |

Where Dye (I-1) of the present invention was used, no coloration of the cleaning solution was observed at all. Where Dyes (A) and (B) were used, coloration of the solutions occurred, and thus they are not practical.

EXAMPLE 2

In place of the dyes used in Example 1, 7 g of a dye having the following formula (C) was added to 800 ml of methanol (containing 20 g of the polymer as described in Example 1), and a considerable amount of the dye was not dissolved. In order to dissolve the dye completely in the same amount of methanol, the amount of the dye had to be reduced to 3 g.

Dye (C)

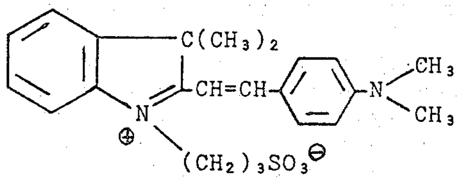

The solution so prepared was coated in the same manner as used in Example 1 to provide a backing layer. The absorption density of the backing layer as obtained above at a wavelength of 530 nm was measured, and the results obtained are shown below together with that of Dye(I-1) of Example 1.

| | |
|---|---|
| Dye (C) | 0.43 |
| Dye (I-1) | 0.62 |

In order to prevent halation completely where a light-sensitive plate was imagewise exposed using green light of a wavelength of 530 nm, the absorption density of the backing layer must be at least 0.5. The backing layer produced using Dye (C) was insufficient in absorption density. If the amount of the coating solution to be coated per a unit area was increased, it was possible to obtain a density of 0.5 or more, but this made a uniform coating of the backing layer difficult.

EXAMPLE 3

The procedure of Example 1 was repeated using Dyes (I-1), (A), and (B) to produce 60 sheets of light-sensitive plates in each case. Without exposure, each of the 60 sheets of the light-sensitive plates were processed with a developer of the following composition at a temperature of 20°C for 5 minutes, and the developer was then transferred to a color-less and transparent vessel and observed in a light room.

| Composition of Developer | Quantity (g) |
|---|---|
| N-Methyl-p-aminophenol Sulfate | 2 |
| Sodium Sulfite (anhydrous) | 90 |
| Hydroquinone | 8 |
| Sodium Carbonate (monohydrate) | 52.5 |
| Potassium Bromide | 5 |
| Water to make | 1 l |

After the development, the light-sensitive plate was passed through a 2% acetic acid aqueous stopping bath, fixed using a solution of the following composition for 3 minutes, and washed in flowing water for 10 minutes (at a temperature of 20°C).

| | Quantity (g) |
|---|---|
| Sodium Thiosulfate (anhydrous) | 300 |
| Sodium Sulfite (anhydrous) | 15 |
| Glacial Acetic Acid | 12 ml |
| Sodium Metaborate | 12 |
| Potassium Alum | 20 |
| Water to make | 1 l |

The same processing was applied to a light-sensitive plate which had only an emulsion layer and was not provided with a backing layer.

Where Dyes (I-1) and (B) were used, the coloration of the developer after the processing was substantially the same as in the comparison example in which the backing layer was omitted. Where Dye (A) was used, the developer turned pale red. With the light-sensitive plate after fixing and washing processing, where Dyes (I-1) and (B) were used, no coloration was observed, whereas where Dye (A) was used, a part of the light-sensitive plate was colored pale red.

It can be seen that the light-sensitive plate having the backing layer containing Dye (I-1) did not color the developer and the photographic emulsion layer treated with the developer was not colored.

The prior art Dye (B) did not cause a coloration of the developer and the light-sensitive plate after processing similar to the case where Dye (I-1) was used, in this example, but Dye (B) has a drawback, as shown in Example 1, that Dye (B) stains a chlorinated hydrocarbon cleaning solution.

EXAMPLE 4

The procedure of Example 1 was repeated using Dyes (I-1), (A), (B), and Dye (D) having the following formula to produce two sheets of light-sensitive plates in each cases.

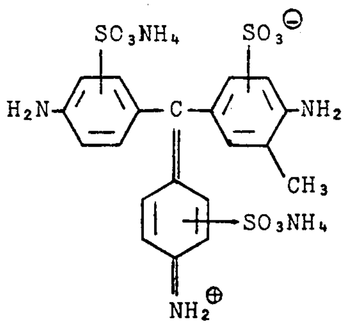

In each case, the light-sensitive plates were superposed on each other in such a manner that the emulsion layer of one of the light-sensitive plates was in contact with the backing layer of the other light-sensitive plate, and the plates so stacked were stored in a dark place at a temperature of 40°C and at a relative humidity of 80% for 7 days.

A comparison sample was produced by contacting a glass surface not having a backing layer with the emulsion layer, and the sample was processed in the same manner as described above.

The emulsion layer which was in contact with the backing layer or the glass surface, was subjected to sensitometry. That is, the emulsion layer of the light-sensitive plate was exposed for 2 seconds to illumination of a color temperature of 2,660°K and a luminous intensity of 8,000 luxes through a Fuji BPN 53 filter (absorption maximum wavelength 530 nm, transmittance 42%) and a neutral grey scale of a density gradation of 0.1, and thereafter the light-sensitive plate was developed. The development was conducted using the same processing solution, the same temperature, and the same period as used in Example 3. The results of the sensitometry are shown below. The value of sensitivity was calculated by subtracting the logarithm of the exposure amount corresponding to a photographic density of 2 on the photographic characteristic curve obtained from a definite value 5 and multiplying the resulting value by 10.

| | Value of Sensitivity | Variance from Comparison |
|---|---|---|
| Dye (I-1) | 15 | 0 |
| Dye (A) | 14 | −1 |
| Dye (B) | 15 | 0 |
| Dye (D) | 13 | −2 |
| Comparison (having no backing layer) | 15 | |

The hitherto known styryl dye (A) and triphenylmethane dye (D) caused a desensitization of the emulsion layer when the backing layers containing the dyes contacted the photographic emulsion layer on storage at a high temperature and high humidity. It can be understood that the backing layer containing Dye (I-1) of the present invention does not cause a desensitization of the emulsion layer as does an oxonol dye, Dye (B).

EXAMPLE 5

A solution of the following composition was prepared.

| | |
|---|---|
| Ethanol | 500 ml |
| Ethyl Butyrate | 150 ml |
| Ethylene-Maleic Anhydride Copolymer* | 15 g |
| Dye I-15 | 6 g |
| Dye I-14 | 6 g |

*Molar ratio: 1:1; Intrinsic viscosity in ethanol: 1.3

This coating solution was coated on one side of an uncolored cellulose acetate film base, the side not being subjected to an undercoating processing, and the other side of which was subjected to the undercoating processing, in an amount of 9 ml per square meter. The layer so prepared was dark blue.

As a comparison, a solution was prepared using carbon black in place of the dyes in the above composition, and the solution was coated in the same manner as described above.

On the film surface opposite the colored layer was coated a red sensitized silver chlorobromide gelatin emulsion comprising 40 mol% of silver chloride and 60 mol% of silver bromide and having an average particle edge length of 0.3 μm in a dry thickness of 4 μm. The emulsion contained 3,3'-disulfobutyl-9-methylthiacarbocyanine as a red sensitizer. For comparison, the same emulsion as used above was coated on a film on which the backing layer was not provided.

Microphotographing of a document (black-print in No. 5 type on a white sheet) on a scale of 1/30 using these films was conducted, and these films were developed with a developer of the following composition at 20°C for 4 minutes, and then subjected to the same stopping, fixing, and washing as used in Example 1.

| | Quantity (g) |
|---|---|
| N-Methyl-p-aminophenol Sulfate | 1 |
| Sodium Sulfite (anhydrous) | 75 |
| Hydroquinone | 9 |
| Sodium Carbonate (monohydrate) | 29 |
| Potassium Bromide | 6 |
| Water to make | 1 l |

With the film sample on which the backing layer was not provided, even when exposure was applied in such a limited amount that the density at the background was about 1.0, no staining of the figure area was observed. However, with the film samples having the backing layer containing Dyes (I-14) and (I-15) or the backing layer containing carbon black, even when the exposure was applied in such an amount that the density at the background was about 2.0, clear figure images could be obtained. Also, no coloration of the transparent portion of the film processed was observed at all.

Where Dyes (I-14) and (I-15) were used in the backing layer, the coloration of the developer after processing was not observed, whereas with the sample which contained carbon black in the backing layer thereof, a black turbidity was observed in the developer.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive member comprising a support having on one side of said support at least one silver halide photographic emulsion layer and on the other side of said support at least one layer containing at least one dye represented by the following formula (I):

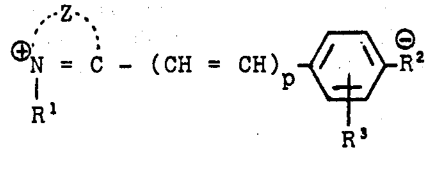

(I)

wherein Z is a group of atoms required for forming an indolenine nucleus or a benzindolenine nucleus; $R^1$ is a lower alkyl group or a lower alkenyl group; $R^2$ is an $—OXSO_3^-$ group or an

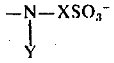

group wherein X is an alkylene group or an alkenylene group, and Y is a hydrogen atom, an alkyl group, an alkenyl group, an aryl group, an acyl group, or an $—OXSO_3^-$ group; $R^3$ is a hydrogen atom, a halogen atom, an alkyl group, an alkenyl group, a hydroxy group, an alkoxy group, an alkylthio group, a carboxy group, an alkoxycarbonyl group, an alkoxycarbonylamino group, or an acylamino group; and *p* is 1 or 2.

2. The silver halide light-sensitive member according to claim 1, wherein the nucleus formed by Z is substituted with one or more halogen atoms, alkyl groups containing 1 to 4 carbon atoms, alkoxy groups containing 1 to 4 carbon atoms, hydroxy groups, carboxy groups, alkoxycarbonyl groups containing 1 to 4 carbon atoms in the alkoxy moiety, amino groups, alkylamino groups containing 1 to 4 carbon atoms in the alkyl moiety thereof, dialkylamino groups containing 1 to 4 carbon atoms in each of the alkyl moieties thereof, or acylamino groups containing 1 to 5 carbon atoms in the alkyl moiety thereof.

3. The silver halide light-sensitive member according to claim 1, wherein $R^1$ is an alkyl group containing 1 to 4 carbon atoms or an alkenyl group containing 1 to 4 carbon atoms.

4. The silver halide light-sensitive member according to claim 1, wherein $R^1$ is selected from the group consisting of a methyl group, an ethyl group, a butyl group, an allyl group, and a methallyl group.

5. The silver halide light-sensitive member according to claim 1, wherein $R^2$ is an $—OXSO_3^-$ group or an

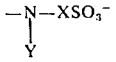

group wherein X is an alkylene or alkenylene group containing 2 to 5 carbon atoms, and Y is a hydrogen atom, an alkyl group containing 1 to 8 carbon atoms, an alkenyl group containing 2 to 8 carbon atoms, an aryl group, an acyl group, or groups having the same meanings as those defined by $—XSO_3^-$.

6. The silver halide light-sensitive member according to claim 5, wherein X is selected from the group consisting of an ethylene group, a butylene group, and a propenylene group.

7. The silver halide light-sensitive member according to claim 1, wherein $R^3$ is a hydrogen atom, a halogen atom, an alkyl group containing 1 to 4 carbon atoms, an alkenyl group containing 2 to 4 carbon atoms, a hydroxy group, an alkoxy group containing 1 to 4 carbon atoms, an alkylthio group containing 1 to 4 carbon atoms in the alkyl moiety thereof, a carboxy group, an alkoxycarbonyl group containing 1 to 4 carbon atoms in the alkoxy moiety thereof, an alkoxycarbonylamino group containing 1 to 4 carbon atoms in the alkoxy moiety thereof, or an acylamino group containing 1 to 5 carbon atoms in the alkyl moiety thereof.

8. The silver halide light-sensitive member according to claim 1, wherein said layer containing said at least one dye represented by the formula (I) includes a binder.

9. The silver halide light-sensitive member according to claim 8, wherein the binder is a polymer which is soluble in a low boiling organic solvent and an alkaline solution.

10. The silver halide light-sensitive member according to claim 1, wherein the support is selected from the group consisting of a glass plate, a synthetic polymer film, paper, baryta coated paper, α-olefin polymer coated paper, synthetic paper, and metal.

* * * * *